United States Patent [19]

Khoe et al.

[11] Patent Number: 4,478,485
[45] Date of Patent: Oct. 23, 1984

[54] CONNECTOR FOR COUPLING AT LEAST ONE OPTICAL FIBER TO A FURTHER OPTICAL ELEMENT

[75] Inventors: Giok D. Khoe; Johannes H. F. M. Van Leest; Lambertus J. Meuleman, all of Eindhoven, Netherlands

[73] Assignee: U.S. Philips Corporation, New York, N.Y.

[21] Appl. No.: 375,150

[22] Filed: May 5, 1982

[30] Foreign Application Priority Data

May 12, 1981 [NL] Netherlands .......................... 8102309

[51] Int. Cl.³ .............................................. G02B 7/26
[52] U.S. Cl. ................................. 350/96.20; 350/96.21
[58] Field of Search ............... 350/96.15, 96.20, 96.21, 350/96.22

[56] References Cited

U.S. PATENT DOCUMENTS 4,289,374 9/1981 Franken et al. ................... 350/96.20
4,311,359 1/1982 Keller ................................ 350/96.20

FOREIGN PATENT DOCUMENTS 2057158 3/1981 United Kingdom ............. 350/96.21
2054893 6/1981 United Kingdom ............. 350/96.21

Primary Examiner—John D. Lee
Assistant Examiner—Brian M. Healy
Attorney, Agent, or Firm—Marc D. Schechter

[57] ABSTRACT

A connector, for coupling pairs of (monomode) optical fibers, comprising a central connection portion, with a V-groove, and two holders. A cylindrical envelope of an optical fiber is arranged in each holder to be resilient in the longitudinal direction. A pin 4 is secured parallel to each envelope. The envelope is retained in the V-groove by a hold-down spring. When the envelope and the pin are inserted into the central connection portion, the envelope is clamped by a clamping spring which is actuated by the pin after the envelope has reached its ultimate position, e.g. against an abutment pin.

9 Claims, 5 Drawing Figures

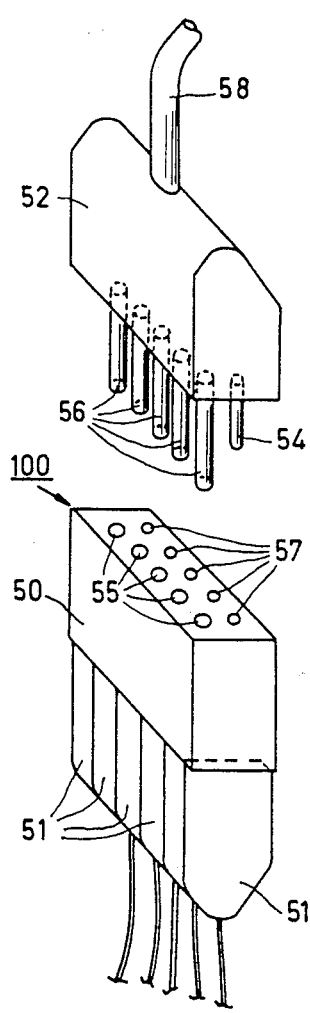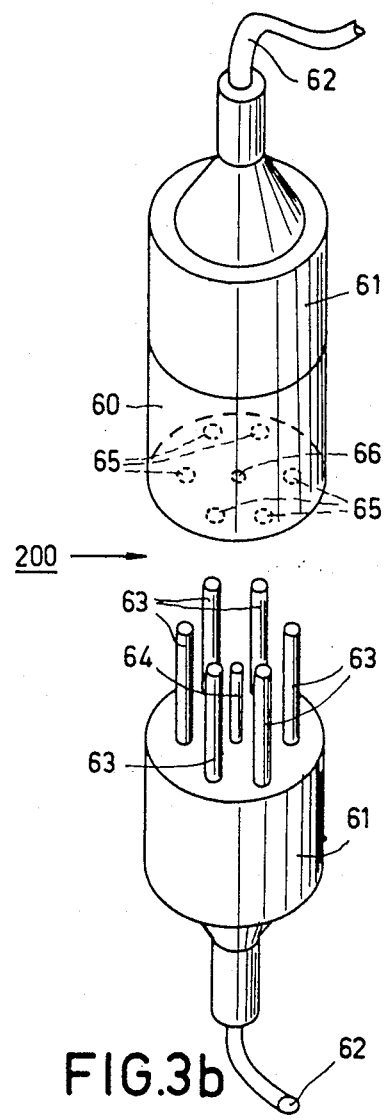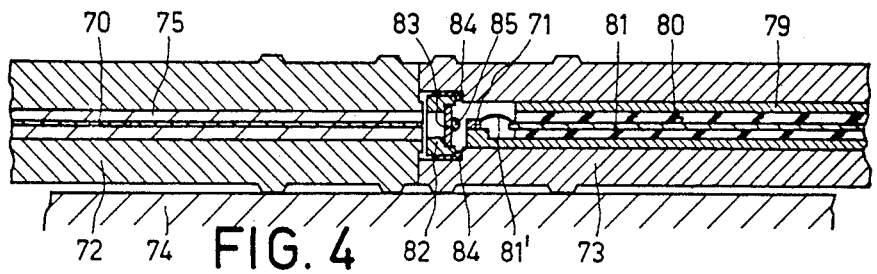
FIG.3a   FIG.3b
FIG.4

CONNECTOR FOR COUPLING AT LEAST ONE OPTICAL FIBER TO A FURTHER OPTICAL ELEMENT

BACKGROUND OF THE INVENTION

The invention relates to a connector for coupling at least one optical fiber to an optical element such as a light source, a light detector or another optical fiber. The optical element and the end of the first optical fibre are each secured in a separate cylindrical member. The connector comprises two holders, and at least one cylindrical member is arranged to be resiliently displaceable in the longitudinal direction in each holder. The connector is also provided with registration means in the form of at least one V-groove, and resilient clamping means which clamp the cylindrical members in the V-groove in order to couple the optical fiber and the optical element. The resilient clamping means is actuated by a pin which is secured to one of the holders.

A connector of this kind is known from published British Patent Application No. 2,054,893. The connector described therein comprises resilient clamping means which consist of a curved spring. The curved spring is pressed onto the cylindrical members in the connector by a pin as soon as the cap, secured to a first holder, slides over a projecting portion of a pin which is secured to the second holder. The two cylindrical members must be pressed into and clamped in the V-groove by the spring. The holders are further slid into one another in order to achieve the necessary alignment of the fibers secured in the cylindrical members. Because the end faces of (the optical fibers in) the cylindrical members are pressed against one another while engaging the coupling, the following situations can occur due to the friction thus produced:

(1) the cylindrical members are not accurately positioned in the V-groove ("retain one another"), or (2) the end faces slide over one another (leading to damage) as the cylindrical members assume the desired relative positions in the V-groove. In the former case, loss of light occurs (notably in the case of a coupling between monomode optical fibers) and in the second case the end faces will be damaged, which also leads to loss of light (inter alia also due to contamination by abrasion products from burrs on the end faces).

SUMMARY OF THE INVENTION

It is an object of the invention to provide an improved connector for coupling an optical fiber, especially a monomode optical fiber, to a light source, a light detector or another optical fiber. It is also an object of the invention to provide such a connector in which the cylindrical members can be held substantially stationary, during the coupling operation, in the V-groove in their correct positions.

According to the invention there is provided an optical fiber coupling connector for coupling at least one optical fiber to an optical element such as a light source, a light detector or another optical fiber. The optical element and the end of the first optical fiber are each secured in a corresponding cylindrical member. The connector comprises two holders, and at least one cylindrical member arranged to be resiliently displaceable in the longitudinal direction in each holder. The connector is provided with registration means in the form of at least one V-groove, and resilient hold-down and clamping means which hold and clamp the cylindrical members in the V-groove in in order to couple the optical fiber and the optical element. The resilient clamping means is actuated by a pin which is secured to one of the holders. In the unactuated condition of the resilient hold-down means and in the absence of a corresponding cylindrical member, the resilient hold-down means is arranged relative to the V-groove so that the maximum diameter of an imaginary circle which can be inscribed in a plane at right angles to the longitudinal direction of the V-groove between the surfaces of the V-groove and a holding surface of the resilient hold-down means is less than the diameter of the corresponding cylindrical member at that point when fully engaged. The arrangement is such that while engaging the connector each cylindrical member is maintained in contact with the V-groove by the resilient hold-down means before the end faces of the cylindrical members or the optical fiber or optical element secured therein, are brought into contact with one another. The resilient hold-down means in a connector according to the invention ensure that the cylindrical member reaches its final position in the V-groove before the cylindrical member is clamped by the resilient clamping means.

In a preferred embodiment of a connector according to the invention, the resilient hold-down and clamping means comprise a hold-down spring and a clamping spring, respectively. The hold-down spring is arranged between the V-groove and the clamping spring. The clamping spring bears forcibly on the hold-down spring when it is actuated by the pin, thus clamping the cylindrical member into the V-groove. The cylindrical member is lightly pressed into the V-groove by the hold-down spring (preferably a leaf spring). The force of the comparatively heavy clamping spring is applied only after the cylindrical member has assumed its final position. This construction is advantageous because a light hold-down spring can be more readily pushed aside by the cylindrical member than a stiff clamping spring.

In a further embodiment of a connector according to the invention, several cylindrical members are arranged substantially parallel to one another in a holder. Such a holder enables several pairs of optical fibers to be coupled simultaneously in a single coupling operation.

BRIEF DESCRIPTION OF THE DRAWING

FIGS. 3a and 3b are perspective views of connectors for simultaneously coupling several pairs of optical fibers according to the invention.

FIG. 4 is a longitudinal sectional view of abutting portions of two cylindrical members, in one of which a light source is arranged.

DESCRIPTION OF THE PREFERRED EMBODIMENTS

Figure 1:
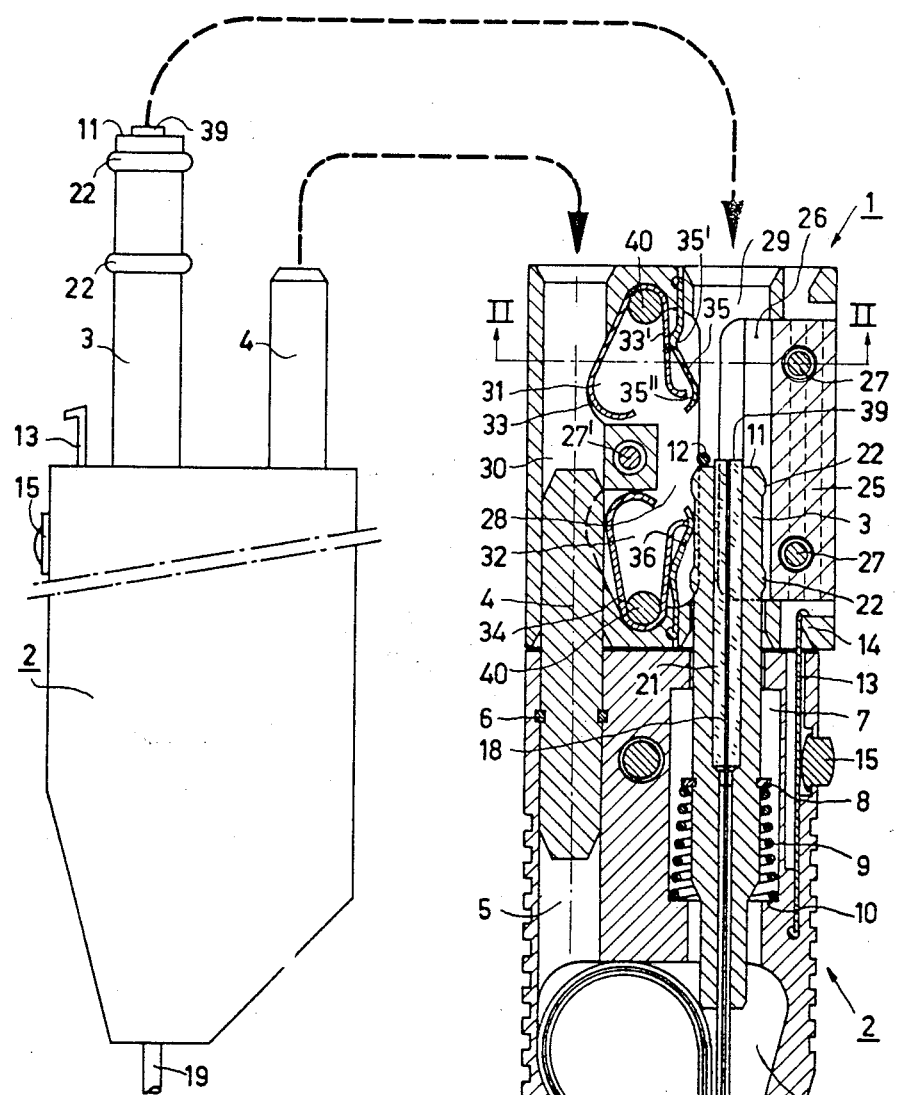
FIG. 1 is a longitudinal sectional view of a central connecting portion and one connector holder, and is a side elevation view of another connector holder.

The connector shown in FIG. 1 comprises a central connection portion 1 and two holders 2 (one of which is shown in a cross-sectional view and the other one in a side elevational view). A cylindrical member in the form of an envelope 3, and a pin 4 project from each holder 2. Envelopes 3 and pins 4 are respectively slid into the central connection portion 1 from corresponding sides.

Each holder 2 comprises a first recess 5 in which the pin 4 is secured by means of a spring clip 6. The envelope 3 is resiliently mounted in a second recess 7. To achieve this, the envelope 3 is provided with a retaining ring 8 on which one end of a helical spring 9 bears. The other end of the helical spring 9 bears against an abutment 10 formed in the recess 7 and urges the end face 11 of the envelope 3 against a pin 12 which is located in the central connection portion 1.

Each holder 2 is further provided with a resilient claw 13 which engages the inner face of retaining part 14 of the connection portion 1 when the holder 2 is coupled to the connection portion 1, in order to guard against an accidental displacement of the holder 2 from engagement with the portion 1. The holder 2 is provided with a push-button 15 to disengage claw 13 from the retaining part 14, after which the holder 2 can be removed from the connection portion 1.

Each holder 2 includes a chamber 16 in which a portion 17 of an optical fiber 19 is stored in the form of a loop in order to ensure unobstructed movement of the envelope 3 in which an end 18 of the optical fiber 19 is secured. The coated fiber 19 is glued or clamped in a passage 20, so that the portion 17 of the fiber 19 cannot be pulled out of the chamber 16. The holder 2 comprises several openings 20 for feeding the fiber 19 into the holder 2 from alternative directions as desired.

The fiber end 18 is glued in a glass capillary 21 which in turn is secured in the envelope 3. The envelope 3 is provided with two abutment rims 22. The outer circumference of each rim 22 is concentric with the light conductive core of the fiber end 19. Such an envelope 3 with concentric abutment rims 22 and its manufacture are described, inter alia, in U.S. Pat. No. 4,289,374.

The central connection portion 1 (FIGS. 1 and 2) includes a rigid block 25 with a V-groove 26. The block 25 is secured in a housing 28 by means of two bolts 27. The housing 28 is formed with two bores 29 and 30, and two chambers 31 and 32. The block 25 with the V-groove 26 projects into the first bore 29. The two chambers 31 and 32 are situated adjacent to and between the two bores 29 and 30.

In each chamber 31 and 32 there are secured U-shaped clamping springs 33 and 34 and hold-down springs 35 and 36. The hold-down springs 35 and 36 are leaf springs situated between the V-groove 26 and the clamping springs 33 and 34. In the unengaged condition of the coupling, the maximum diameter of an imaginary circle which can be inscribed in a plane at right angles to the longitudinal direction of the V-groove 26, between the engagement surface of the hold-down spring 35 or 36 and the surface of the V-groove 26 is slightly less than the diameter of the envelope 3 in the region between the abutment rims 22.

When a first holder 2 is coupled to the central connection portion 1, the envelope 3 is slid into the bore 29, under the hold-down spring 35 or 36 and in the V-groove 26. Light pressure from the hold-down spring 35 or 36 presses the abutment rims 22 into the groove 26 (for example, with a force of at most 1N). The envelope 3 is slid into the bore 29 so far that the end face 11 of the envelope 3 abuts against the pin 12. The envelope 3 is then held stationary.

When the holder 2 is moved further toward the connection portion 1, the helical coil 9 is compressed. The pin 4 then enters the bore 30 and actuates the clamp by engaging and deflecting the U-shaped clamping spring 33 or 34, so that the latter pivots about the pin 40 and is urged toward the V-groove 26.

The hold-down spring 35 preferably is a leaf spring. It is secured at one end to the central connection portion 1 and comprises, viewed from the secured end, a first curved portion 35' which is remote from the V-groove 26 and a second curved portion 35" which faces the V-groove. A limb 33' of the U-shaped clamping spring 33, bears against the first curved portion 35' of the leaf spring 35.

When the clamping spring 33 is actuated by the pin 4, the clamping spring 33 pivots about the pin 40 and presses the first curved portion 35' of the leaf spring 35 toward the V-groove 26. Consequently, the portion of the leaf spring 35 which is not secured (i.e. the curved portion 35") will move in the direction of the pin 12 and will thus tend to slide the corresponding envelope 3 now present in the V-groove, in a direction toward the pin 12. Subsequently (when the clamping spring 33 is further compressed by the pin 4), the end of the limb 33' engages the leaf spring 35 between the first and the second curved portion 35". The end preferably engages near the second curved portion 35" where the latter is already in contact with the envelope 3. The stationary envelope 3 which has already been accurately positioned in the groove 26 by the hold-down spring 35 or 36, is thus clamped.

As the holder 2 continues to move toward the portion 1, the claw 13 ultimately engages the inner face of the retaining part 14 in the housing 28, and the coupling between the holder 2 and the portion 1 is completed.

When a second holder 2 is coupled to the portion 1, the procedure is identical, although the end face 11 of the envelope 3 might not abut against the pin 12. It is preferable at this stage for the end faces 39 of the glass capillaries 21 to abut against one another. The two envelopes 3 at this point are already correctly positioned by the groove 26.

It is to be noted that the clamping springs 33 and 34, also clamp the pins 4 in the housing 28, and that the locking of the holders 2 by means of the claw 13 which engages the retaining part 14, is a protection against an accidental displacement of the holders 2.

Figure 2:
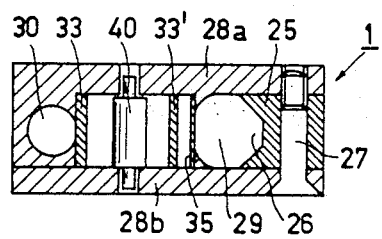
FIG. 2 is a cross-sectional view along line II—II of FIG. 1 of a central coupling portion.

FIG. 2 is a cross-sectional view along line II—II of FIG. 1 of the central connection portion 1. The housing 28 comprises a box-shaped portion 28a and a lid 28b which are interconnected by means of bolts 27 and 27' (see FIG. 1). The block 25, in which there is formed the V-groove 26, is also secured between the portion 28a and the lid 28b by means of the bolts 27. The cross-sectional view also clearly shows the bores 29 and 30. The bore 29 is bounded on one side by the hold-down spring 35. The bore 30 is bounded on one side by the clamping spring 33. FIG. 2 shows a cross-section of the clamping spring 33 at two locations because of its U-shape. The curved central portion of the clamping spring 33 extends behind the pin 40 in FIG. 2.

The connector 100 according to the invention which is shown in FIG. 3a comprises a central connection portion 50, a plurality of individual holders 51 and a multiple holder 52. The form of connector 100 simultaneously couples several couplings (five in the embodiment of FIG. 3a) optical fibers, each of which is secured in a corresponding individual holder 51, to five other optical fibers brought together to form a bundle 58 and secured in the holder 52.

The single holders 51 are identical to the holders 2 shown in FIG. 1. The multiple holder 52 and the central connection portion 50 are in fact formed by a parallel arrangement of connection assemblies each corresponding to those of the single holders 2 and to the corresponding parts of the central connection portions 1, respectively, as shown in FIGS. 1 and 2.

However, it is not necessary for the central connection portion 50 to comprise five separately acting clamping springs (actuated by pins 54 on the holder 52). After inserting and positioning the envelopes 56 in the bores 55, the envelopes 56 can all be clamped in the portion 50 by one or two clamping springs which clamp five or two and three envelopes, respectively. In that case the number of pins 54 need not correspond to the number of envelopes 56 secured in a multiple holder 52.

The connector 200 according to the invention which is shown in FIG. 3b comprises a central connection portion 60 and two holders 61. To each holder 61 there is connected a cable 6 which comprises six optical fibers (not visible in the Figure). In each holder 61 six envelopes 63, in which ends of the optical fibers are secured, are resiliently arranged about a central pin 64. The envelopes 63 are simultaneously inserted into bores 65 formed in the central connection portion 60. Each of the bores is provided with a corresponding V-groove (not shown). The pin 64 fits in a hole 66 and simultaneously actuates six clamping springs (not visible in the Figure) in order to clamp the six envelopes 63 in the V-grooves.

FIG. 4 shows a coupling between an optical fiber and an optical element in the form of a semi-conductor laser. The optical fiber and the laser are each secured in a cylindrical envelope 72 and 73, respectively which engages a wall 74 of a V-groove (not shown) in which the envelopes 72 and 73 are arranged.

The optical fiber 70 is secured in a glass capillary 75 which in its turn is glued into the envelope 72. The semiconductor laser 71 is mounted on an end of an electrically and thermally conductive bushing 79. In the bushing 79, there is secured an electrical conductor 81 which is surrounded by an insulating mass 80 (for example, glass) and which is electrically connected to the semiconductor laser 71 via a wire 81'. A hermetically sealed space is formed for the laser 71 by means of a glass plate 83 which is secured in a ring 82. The ring 82 is mounted in the envelope 73 by means of a soft and readily deformable metal alloy 84 (for example, indium-tin). As a result of the use of a soft metal alloy 84, the ring 82 can be displaced with respect to the laser 71, together with the glass plate 83, so that a lens 85 mounted on the glass plate 83 can be aligned with respect to the laser 71.

What is claimed is:

1. A connector for coupling at least one optical fiber to a light source, a light detector, or another optical fiber, said connector comprising:
   a holder having a longitudinal direction;
   a pin extending from the holder in the longitudinal direction and secured to the holder;
   a cylindrical member extending from the holder in the longitudinal direction and being arranged in the holder to be resiliently displaceable in the longitudinal direction, said cylindrical member having a diameter;
   a central connection portion having a first bore adjacent a V-shaped groove and having a second bore, said first and second bores and said V-shaped groove extending in the longitudinal direction;
   resilient hold-down means arranged in the central connection portion opposite the V-shaped groove for holding the cylindrical member in the V-shaped groove, said resilient hold-down means being arranged such that in the absence of the cylindrical member in the V-shaped groove the maximum diameter of an imaginary circle which can be inscribed between the V-shaped groove and the resilient hold-down means in a plane perpendicular to the longitudinal direction is less than the diameter of the cylindrical member at the location where the cylindrical member is held by the resilient hold-down means; and
   resilient clamping means arranged in the central connection portion opposite the V-shaped groove for clamping the cylindrical member in the V-shaped groove, said resilient clamping means being actuatable by the pin secured to the holder when the pin is slid into the second bore in the central connection portion.

2. A connector as claimed in claim 1, characterized in that:
   the resilient hold-down means comprises a hold-down spring; and
   the rsilient clamping means comprises a clamping spring;
   wherein the hold-down spring is arranged between the V-shaped groove and the clamping spring, the clamping spring bearing forceably on the hold-down spring when the clamping spring is actuated by the pin, thus clamping the cylindrical member in the groove.

3. A connector as claimed in claim 2, characterized in that:
   the hold-down spring is a leaf spring which is secured at one end to the central connection portion and which, proceeding from the secured end, first curves away from the V-shaped groove and then curves toward the V-shaped groove; and
   the clamping spring is U-shaped and has a first limb which is arranged to bear against the first curve of the hold-down spring.

4. A connector as claimed in claim 3, characterized in that when the clamping spring is actuated by the pin, the first limb of the clamping spring urges the first curved portion of the hold-down spring in the direction of the V-shaped groove, and the end of the first limb engages the hold-down spring at a position near the second curve in the hold-down spring.

5. A connector as claimed in claim 4, characterized in that:
   the cylindrical member is provided with two abutment rims for locating the cylindrical member in the V-shaped groove; and
   the second curve of the hold-down spring bears on the cylindrical member between the rims when a holder is coupled to a central connection portion.

6. A connector as claimed in claim 5, characterized in that the resilient clamping means comprises two U-shaped clamping springs arranged adjacent the V-shaped groove, each clamping spring having a second limb extending into the second bore in the central connection portion, the pin of the holder being inserted into the second bore and being pressed against the second end of a clamping spring when the cylindrical member is inserted into the first bore of the central connection portion.

7. A connector as claimed in claim 6, characterized in that:

the central connection member includes an abutment pin arranged substantially at the longitudinal midpoint of the V-shaped groove between the two clamping springs; and when a holder is coupled to the central connection portion, the cylindrical member contacts the abutment pin or an end of another cylindrical member already clamped in the V-shaped groove before the longitudinal pin of the holder contacts the clamping spring.

8. A connector as claimed in claim 7, characterized in that several cylindrical members are arranged parallel to one another in a single holder.

9. A connector as claimed in claim 8, characterized in that:

the number of cylindrical members arranged in the holder exceeds the number of pins secured to the holder;

the central connection portion has as many V-shaped grooves as the holder has cylindrical members; and the central connection portion comprises at least one clamping spring which clamps at least two cylindrical members.

* * * * *